March 22, 1949.  J. J. WISLER  2,465,142
SUPPLEMENTAL STORAGE UNIT FOR USE
WITH REFRIGERATED CABINETS
Filed July 22, 1948  2 Sheets-Sheet 1
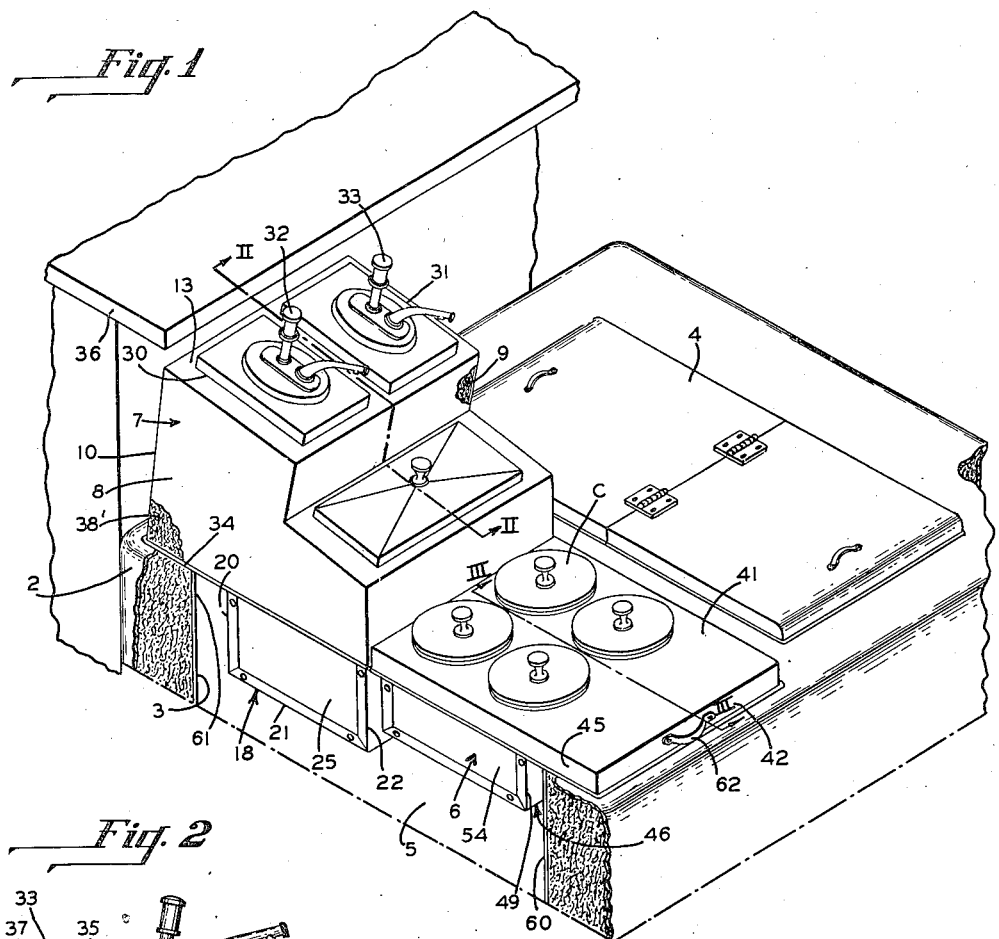
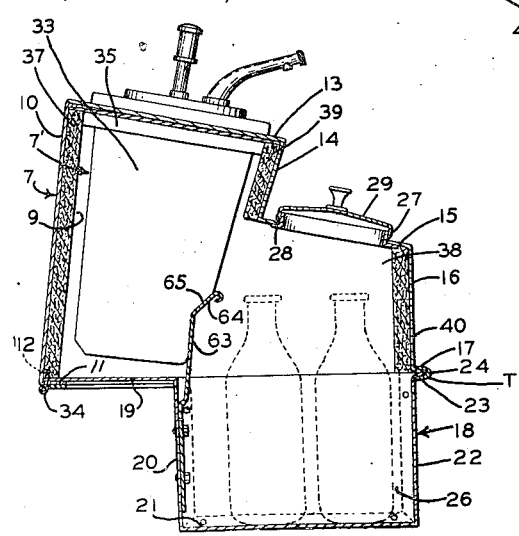
Inventor
John J. Wisler
by Harold N. Borthwick
Attorney March 22, 1949.　　　　J. J. WISLER　　　　2,465,142
SUPPLEMENTAL STORAGE UNIT FOR USE
WITH REFRIGERATED CABINETS
Filed July 22, 1948　　　　　　　　　　　2 Sheets-Sheet 2
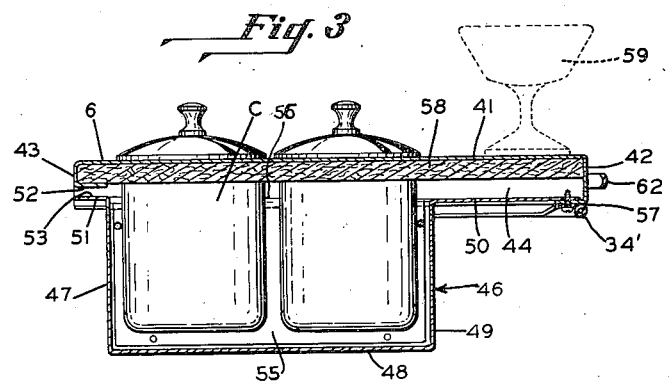
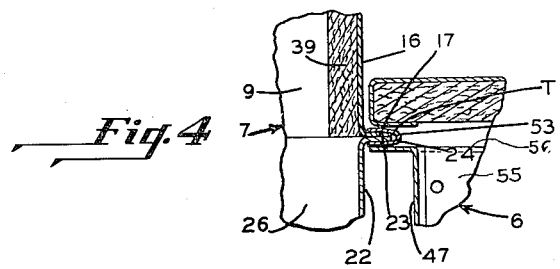
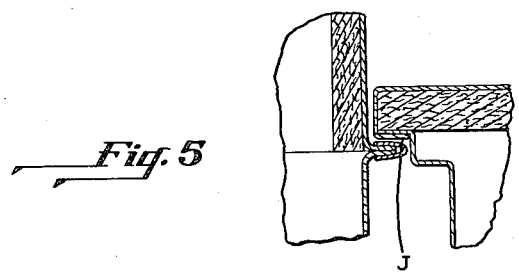
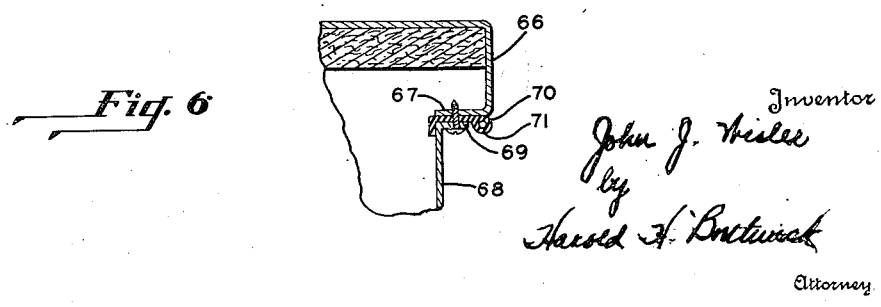
Inventor
John J. Wisler
by
Harold H. Bostwick
Attorney Patented Mar. 22, 1949

2,465,142

UNITED STATES PATENT OFFICE 2,465,142

SUPPLEMENTAL STORAGE UNIT FOR USE WITH REFRIGERATED CABINETS

John J. Wisler, Columbia, Pa., assignor to United Sound and Signal Co., Inc., Columbia, Pa., a corporation of Pennsylvania Application July 22, 1948, Serial No. 40,082

7 Claims. (Cl. 62—89)

The present invention relates to a supplemental storage unit for use with a refrigerated cabinet and more particularly, to a syrup, milk, and crushed fruit dispenser unit which may be inserted into a standard ice cream cabinet so as to derive the benefit of refrigeration therefrom to maintain the syrup, milk, and crushed fruits or the like in proper condition for serving in the preparation of milk drinks, sundaes and the like by a dispenser of ice cream.

Conventional soda fountains are rather expensive and include many more syrup pumps and topping containers than are required by a small confectionery store or corner grocery, which establishments frequently dispense ice cream. The so-called bobtail soda fountains are available and while they contain fewer syrup pumps and topping containers, it is necessary to provide separate refrigeration for the unit; and, as a consequence, these units are likewise relatively expensive.

It is an object of my invention to provide a unit which may be inserted into a standard ice cream cabinet through one of the normal access openings therein so that the unit will derive refrigeration from the ice cream cabinet.

A further object of my invention is to provide a unit which may be conveniently disassembled and a portion thereof removed from the ice cream cabinet in order that the portion of the ice cream cabinet into which the unit is inserted may be used for bulk storage in the area below the unit.

A further object of my invention is to provide a unit which may be conveniently inserted into a standard ice cream cabinet above the level of the top of which a shelf, counter or other projection normally provided for the reception of serving dishes and the like may be positioned and a unit which may also be conveniently removed from the cabinet under such obstruction.

Another object of my invention is to provide a unit which will be free of any substantial tendency to "sweat" on the exposed outer surfaces due to the condensation of moisture thereon.

Another object of my invention is to provide a unit which is made of two separable parts which, when assembled in a cabinet, form a substantially airtight seal over the access opening into which the unit is inserted and in which a portion of the unit may be disassembled from the remainder by a simple motion of one unit with respect to the other and assembly may be similarly effected without removal of the second portion of the unit from its position upon the cabinet.

In order that my invention may be readily understood, I will describe a preferred embodiment thereof which is illustrated in the attached drawings in which:

Figure 1 is an isometric view, partially broken away, showing a unit of my invention mounted in a conventional ice cream cabinet;

Figure 2 is a transverse sectional view of the rear portion of the unit taken along the line II—II of Figure 1;

Figure 3 is a similar sectional view of the front portion of the unit taken along the line III—III of Figure 1;

Figure 4 is a detailed sectional view of the arrangement for interlocking and sealing the two component parts of the unit;

Figure 5 is a detailed sectional view of a modified seal arrangement; and

Figure 6 is a detailed sectional view of a modified heat seal and gasket arrangement.

Referring first to Figure 1, the ice cream cabinet or other similar storage cabinet which is held under refrigeration has been indicated by the numeral 2. This cabinet 2 is provided with an opening 3 which in normal cabinet construction would be closed by slideable or hinged doors or covers such as those indicated at 4. The doors may be opened singly or may be removed as a unit to provide access to the storage area 5 under refrigeration.

The unit of this invention is shown mounted within the access opening 3. It consists of a front section 6 and a rear section 7, each preferably formed exteriorly of sheet stainless steel and interiorly, below the cabinet line, of aluminum, fabricated in the manner hereinafter more fully described.

Considering first the rear section 7 which is illustrated in section in Figure 2, there is an upper receptacle 7', and it is made up of side panel members 8 and 9 and a back panel member 10. Preferred practice is to form the side panels and the back panel from a single piece of sheet metal, bent to the shape indicated in the drawing. The rear and side panels are flanged inwardly as indicated at 11 to receive a lower receptacle 18 which is fastened thereto in an appropriate manner as by means of sheet metal screws, one of which has been shown in dotted lines at 12 in Figure 2. The lower receptacle will be described in detail hereafter. The rear section 7 includes a top panel 13, an intermediate connecting panel 14, a face panel 15, and a front panel 16, all of which are preferably formed of a single sheet of material bent to the desired shape and soldered along the joints between the side panels 8 and 9. The forward end of the front panel 16 is flanged outwardly as indicated at 17.

Disposed below the panels 10 and 16 is the receptacle which has been generally indicated at 18 and is preferably formed of sheet aluminum, including a top panel 19, which forms a partial bottom for the upper receptacle, a rear panel 20, a bottom panel 21, and a front panel 22. The front panel 22 is flanged outwardly at 23 to provide a cooperating flange for flange 17 of the front panel 16 of the upper portion of the unit. The portion of the lower receptacle just described is preferably formed of a single sheet of aluminum bent to the desired shape as indicated. A sheet metal connector 24 is bent to a 360° angle and is clamped over the flanges 17 and 23 to hold them in firm position. The panels 20, 21 and 22 are flanged as indicated in Figure 1 and overlie end panels 25 and 26 which are fastened to the flanges as indicated in Figures 1 and 2. Thus, the receptacle 18 is open-topped but otherwise closed and projects below the upper receptacle 7'.

The face panel 15 is provided with an opening 27, around which is disposed a flange 28 which is formed as a right angle and is soldered or otherwise fastened to the panel 15 so as to project thereabove as shown in Figure 2. A lid or cover 29 is provided for covering the opening 27 defined by the flange 28. This permits access to the lower receptacle 18 which is preferably arranged so as to receive six quarts of milk, used in the preparation of milk-type drinks.

It will be observed that the bottom panel 21 of the lower container 18 lies in a substantially horizontal plane and this makes it possible upon removal of this rear section 7 of the unit to place the same upon a table, counter or other flat surface.

The top panel 13 of the unit 7 is provided with openings, two being indicated at 30 and 31 in Figure 1, and these openings are adapted to receive conventional syrup pumps 32 and 33, including syrup jars which project into and are housed within the upper receptacle 7'.

The rear section 7 is provided with a gasket 34 which extends around the flanges of the side walls 8 and 9 and the back wall 10. The front wall 16 is not gasketed but is provided with the projecting tongue T defined by the strip 24.

If desired, a channel-shaped reinforcing member 35 may be inserted in the center of the top panel 13 to properly support the various wall members against deflection upon operation of the syrup pumps.

A feature of my invention resides in the provision of the angularly disposed rear wall 10, such wall being inclined forwardly of the unit and not in a vertical plane. The angle of the inclination with the horizontal surface 19 may be about 10 to 20 degrees. In many stores where ice cream is dispensed, the ice cream cabinet will be positioned below a shelf or counter such as that indicated at 36 in Figure 1. By providing the inclined rear wall surface, two important advantages are obtained, the primary of which is the ease of removability and insertion of the unit without danger of mishap through engagement with the outward projection 36. Secondarily, the combination of the inclined surface 10 and the inclined surface of the top panel 13 gives the unit the general character and appearance of a conventional soda fountain dispenser unit; and thus, it is more attractive.

Another feature of my invention is the provision of insulation in the areas where sweating is likely to occur due to the condensation of moisture on the exterior metal surfaces, the interior of the unit being disposed within the refrigerated cabinet and thus, by conduction, the various wall panels are below atmospheric temperature. In Figure 2 there is indicated insulation material 37 positioned against the rear wall 10 of the rear section, insulation 38 positioned against the wall 9, corresponding insulation 39 against the wall 14, and insulation 40 against the wall 16. The wall 8 which is not shown in section is provided with a layer of insulation 38' corresponding to the layer 38 which is positioned against the wall 9. Thus, the major surface areas of the rear section, disposed above the cabinet, are properly insulated, preventing heat loss and the condensation of moisture.

The front section 6 is shown in section in Figure 3 and it includes a top panel 41 which is bent downwardly into a front panel 42 and is also bent downwardly at the opposite end into a rear flange 43. The lateral edges of the top panel 41 are folded downwardly into side panels 44 and 45 as shown in Figures 1 and 3. A receptacle generally indicated at 46 is provided in the front section 6, and it is constructed in a manner generally similar to the container 18 of the rear section. It consists of a rear panel 47, a bottom panel 48, a front panel 49 and a forward extension panel 50. The rear panel 47 is flanged outwardly as indicated at 51 and the top panel 41 is flanged inwardly as indicated at 52, thus providing a rectangular opening 53, defined by the flanges 51 and 52. End panels 54 and 55 (Figures 1 and 3) are provided which close the container 46 and are fastened to flanges which are provided on the panels 47, 48 and 49, as shown in Figure 1. The panels 54 and 55 are flanged outwardly at their tops as indicated at 56 and are disposed so as to overlie corresponding inwardly directed flanges 57 provided on the panels 44 and 45 to thus properly support the lower container 46 so that it will be unitary with the top member. Sheet metal screws may be provided for securing together the various elements constituting the front section. One such screw is indicated in Figure 3. These screws may be passed through a gasket 34' corresponding to the gasket 34 of the rear section and disposed under the flanges 57 and extend around the front and sides of the front section, joining with the gasket 34 of the rear section to form a complete seal.

The top panel 41 is insulated by sheet insulation indicated at 58 in Figure 3, the insulation being preferably cemented in place.

The forward unit 6 is provided with a plurality of openings which have been shown in Figure 1. These openings receive containers C which are adapted to receive fruit and other toppings for sundaes. The forward portion of the top panel 41 is left substantially plain so as to provide a working surface upon which the dispenser of milk drinks or sundaes may place containers such as the sundae dish indicated in dotted lines at 59 in Figure 3. The working area is not extensive but it is adequate for most purposes.

Another feature of my invention is illustrated in Figure 4 where there is shown in detail the joint arrangement between the front section 6 and the rear section 7. It will be noted that the opening 53 provided in the forward component 6 is of a cross-sectional shape to receive the tongue portion T formed of parts 17, 23 and 24 of the rear section 7. The joint thus formed prevents the free passage of air into the refrigerated compartment and effectively joins the two units together, while at the same time, it permits convenient assembly and disassembly of the unit. Instead of the joint arrangement shown in Figure 4, the similar arrangement shown in Figure 5 may be provided, wherein there is an overlapped joint J instead of the tongue and groove joint.

It will be observed by reference to Figure 1 that the distance between the rear wall 20 of the lower receptacle 18 and the front wall 49 of the front receptacle 46 is less than the distance between the walls 60 and 61 which define the opening into the ice cream cabinet. Also, the distance between the walls 25 and 54 and the correspondings walls 26 and 55 of Figures 2 and 3 respectively, is less than the width of the opening in the cabinet, but the combined length of the sections and their width are each less than the corresponding dimensions of the opening 3. Thus, the unit may be shifted both longitudinally and laterally to permit proper positioning of the unit with respect to the opening and at the same time effective sealing is obtained by the gasketing arrangement, regardless of minor dimensional differences in the cabinet opening into which the unit is inserted.

An advantage of having the wall 49 spaced a substantial distance from the surface 60 of the cabinet is that such an arrangement facilitates removal of the forward component 6 by a simple forward motion which may be effected through a handle 62 which is affixed to the front panel 42 of the front section 6. When such a motion is imparted, the tongue T of Figure 4 is separated from within the opening 53 and then by a simple pivoting motion, the front section 6 may be elevated above the surface of the cabinet 2 a distance sufficient to permit the unit to be grasped adjacent to the inturned flanges 57 on the sides of the unit and the unit may then be readily removed.

In order to obtain proper cooling of syrup in containers 32 and 33, there may be provided a heat conducting member 63 which is riveted or otherwise secured to the rear wall 20 of the lower receptacle 18 of the rear section 7 as shown in Figure 2. This element 63 is flanged so as to have a portion thereof indicated at 64 lie closely adjacent to and preferably in contact with the inclined surface 65 of the syrup containers 32 and 33. This conducting member is preferably formed of aluminum and extends substantially the entire width of the container 18 between the walls 25 and 26 thereof.

A modified gasketing and heat sealing arrangement is shown in Figure 6 and this structure may be provided instead of the gasketing arrangement shown in the other views. In this structure the front panel 66 is flanged inwardly at 67 and the lower member's front panel 68 is flanged outwardly as indicated at 69. A gasket 70 of similar cross-sectional shape to the gasket 34 is disposed between the flanges 67 and 69. Thus, the portion 68 which is disposed within the cabinet and may constitute one of the lower receptacles 18 or 46 is heat sealed from the upper portion or receptacle 7' or the corresponding upper portion of the front section 6 which is disposed above the cabinet 2. The gasket 70 also serves to seal the access opening in the cabinet by its projecting portion 71 which lies in engagement with the upper surface of the cabinet.

It will be clear from the foregoing description that this unit provides a small, compact supplemental storage unit in which the ice cream dealer may have conveniently accessible for immediate use two or more syrups such as chocolate and vanilla, an adequate supply of milk for the preparation of milk drinks and the like, and a plurality of toppings for sundaes such as crushed fruits, nut toppings, and the like. Also there is an area provided upon which containers may be rested preparatory to, during, or after the preparation of the items to be served. The unit is arranged so that the dealer can use the cold storage compartment of the ice cream cabinet below the dispenser for bulk storage of ice cream or other materials which he may wish to maintain at a safe temperature until ready for consumption. Both the front section and the rear section may be conveniently removed, even though a conventional shelf, counter or other obstruction may be provided overhanging the rear of the cabinet. An effective joint is provided between the sections of the unit, preventing heat loss and possible product contamination in the bulk storage area. Sweating and heat loss through the exposed walls of the major surface areas of the unit are eliminated by the positioning of insulation at the strategic surfaces; and further, heat loss is eliminated by the provision of gaskets which are disposed between the unit and the cabinet surfaces which it overlies. A heat conducting arrangement is provided, effective for maintaining adequate refrigeration of the syrup compartment, providing an additional extensive heat conducting surface contiguous thereto without substantially reducing the cubical capacity of the milk compartment.

While I have illustrated and described a preferred embodiment of my invention, it will be understood that the same is not limited thereto but may be otherwise embodied and practiced within the scope of the following claims.

I claim:

1. A supplemental storage unit for use with a refrigerated cabinet having an access opening therein comprising an upper receptacle, a lower receptacle projecting downwardly from the upper receptacle, a flange projecting outwardly from said lower receptacle, a sealing gasket disposed on said flange, said upper receptacle including a rear wall panel inclined at an angle less than 90° with respect to the plane of said flange, said lower receptacle being constructed and arranged to pass freely through the access opening in a cabinet with which the unit is associated and said flange being constructed and arranged to overlie said cabinet around said access opening.

2. A supplemental storage unit for use with a refrigerated cabinet having an access opening therein, said unit being sectionalized for removal from said cabinet to permit access thereinto through said access opening, said unit comprising a rear section and a front section, one of said sections having a projecting tongue and the other having a complemental recess arranged to receive said tongue and form a sealing joint when said sections are assembled into a unit on a cabinet, a receptacle in the front section, a receptacle in the rear section, said receptacles extending below the upper surface of the cabinet when assembled therewith and said receptacles being so dimensioned that the one section may be moved relatively to the other section for separation of said sections at said joint.

3. A supplemental storage unit for use with a refrigerated cabinet having an access opening therein comprising a sectionalized unit including a rear section and a front section each having receptacles therein adapted to be disposed within the refrigerated portion of a cabinet through an access opening, means for joining said sections against ready air infiltration at the joint comprising a pair of inwardly directed spaced flanges on one section and an outwardly directed tongue on the other section, said flanges and tongue extending transversely of the units adjacent the front of one section and the rear of the other, said tongue fitting within the opening defined by said flanges.

4. A supplemental storage unit for use with a refrigerated cabinet having an access opening therein comprising an upper receptacle formed with a pair of side walls, a back wall inclined forwardly of the vertical, a top wall inclined downwardly of the horizontal, and a front wall, said upper receptacle being constructed and arranged to receive a dispensing unit, a lower receptacle depending from the said upper receptacle and joined thereto and arranged to be disposed within the refrigerated area of a cabinet with which the unit is associated and comprising a top wall constituting a partial bottom for the upper receptacle, side, bottom, and end walls, said lower receptacle opening at its top into said upper receptacle, said upper receptacle having an opening therein affording access to the lower receptacle from the top of the unit.

5. A supplemental storage unit for use with a refrigerated cabinet having an access opening therein comprising an upper sheet metal receptacle, a lower sheet metal receptacle opening into said upper receptacle and arranged to be disposed within a refrigerated portion of a cabinet with which the unit is associated, with the upper receptacle disposed above the top surface of the cabinet, a gasket attached to said unit for engagement with the top surface of said cabinet surrounding the access opening therein, said gasket including an integral flange disposed between said upper and lower receptacles to limit the transfer of heat from one to the other by conduction through the metal of which they are formed, and means passing through said flange joining said receptacles together.

6. A supplemental storage unit for use with a refrigerated cabinet having an access opening therein comprising an upper sheet metal receptacle and a lower sheet receptacle opening into said upper receptacle and arranged to be disposed within a refrigerated portion of the cabinet with which the unit is associated, with the upper receptacle disposed above the top surface of the cabinet, insulation disposed within the upper receptacle adjacent the major surfaces thereof, said upper receptacle having an opening therein for the reception of a syrup jar, and a sheet metal member disposed in heat conducting relationship with a wall of the lower receptacle and extending into the upper receptacle for engagement with said jar to refrigerate the same.

7. A supplemental storage unit for use with a refrigerated cabinet having an access opening therein comprising a rear section and a front section with an interfitting joint therebetween, a lower receptacle in said rear unit for disposition within the refrigerated portion of a cabinet with which said unit is associated, said receptacle providing a compartment for the reception of articles to be maintained at a reduced temperature, an upper receptacle in the rear unit opening into the lower receptacle, means extending from the lower receptacle to the upper receptacle for the transfer of heat from the upper receptacle to the lower receptacle, said upper receptacle providing a compartment for a syrup jar and pump, a receptacle in the front section for disposition within said refrigerated portion of said cabinet, said receptacle providing a compartment for a plurality of containers and an extension on said front section providing a working space in front of said containers.

JOHN J. WISLER.

REFERENCES CITED

The following references are of record in the file of this patent:

UNITED STATES PATENTS

| Number | Name | Date |
|---|---|---|
| 1,817,656 | Valerius | Aug. 4, 1931 |
| 1,879,241 | Hill | Sept. 27, 1932 |